July 5, 1932.  H. G. DAVIS  1,866,251
HOSE REEL AND PROTECTOR
Filed March 10, 1931  2 Sheets-Sheet 1
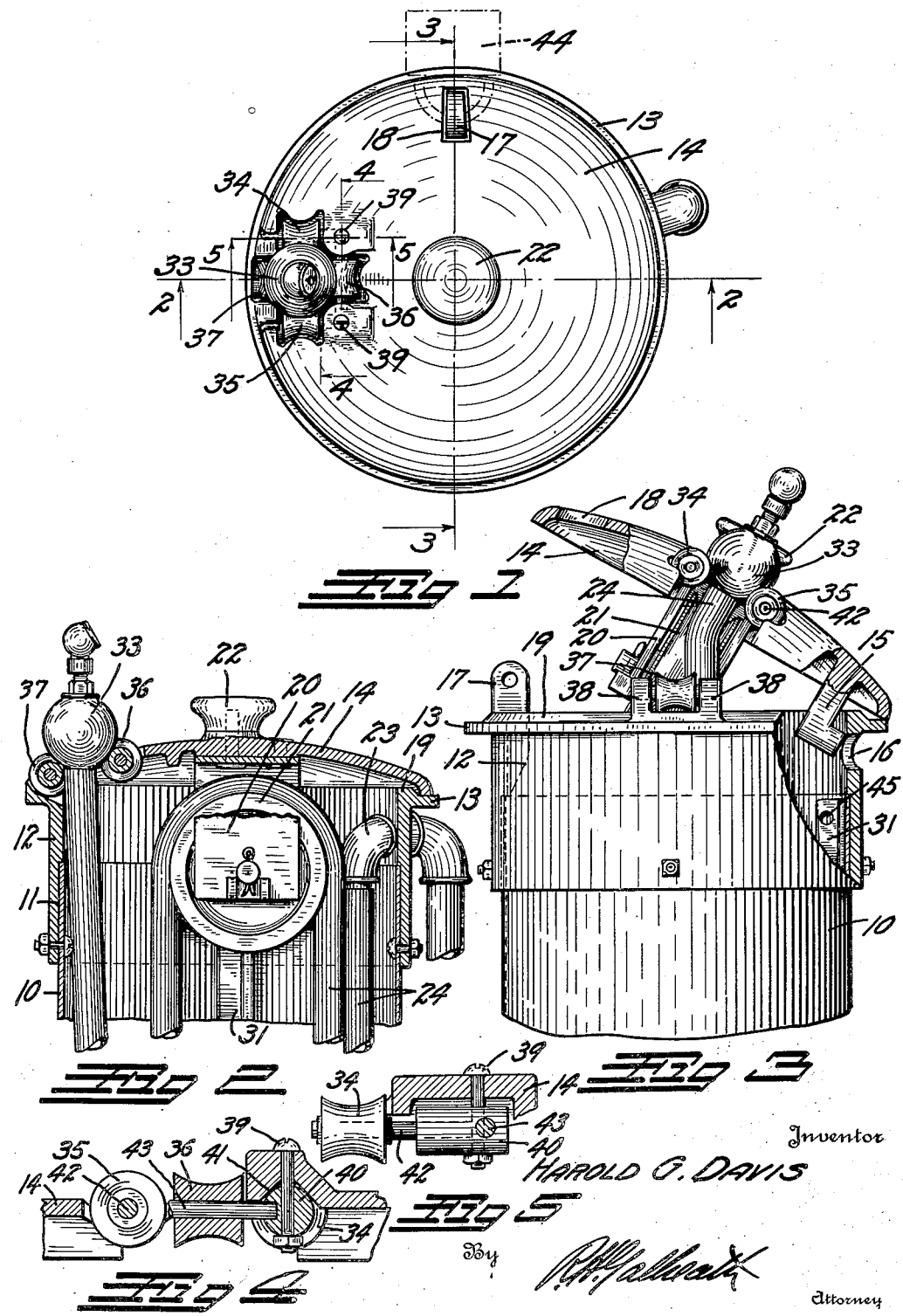
Inventor
HAROLD G. DAVIS
By
Attorney July 5, 1932. H. G. DAVIS 1,866,251
HOSE REEL AND PROTECTOR
Filed March 10, 1931 2 Sheets-Sheet 2
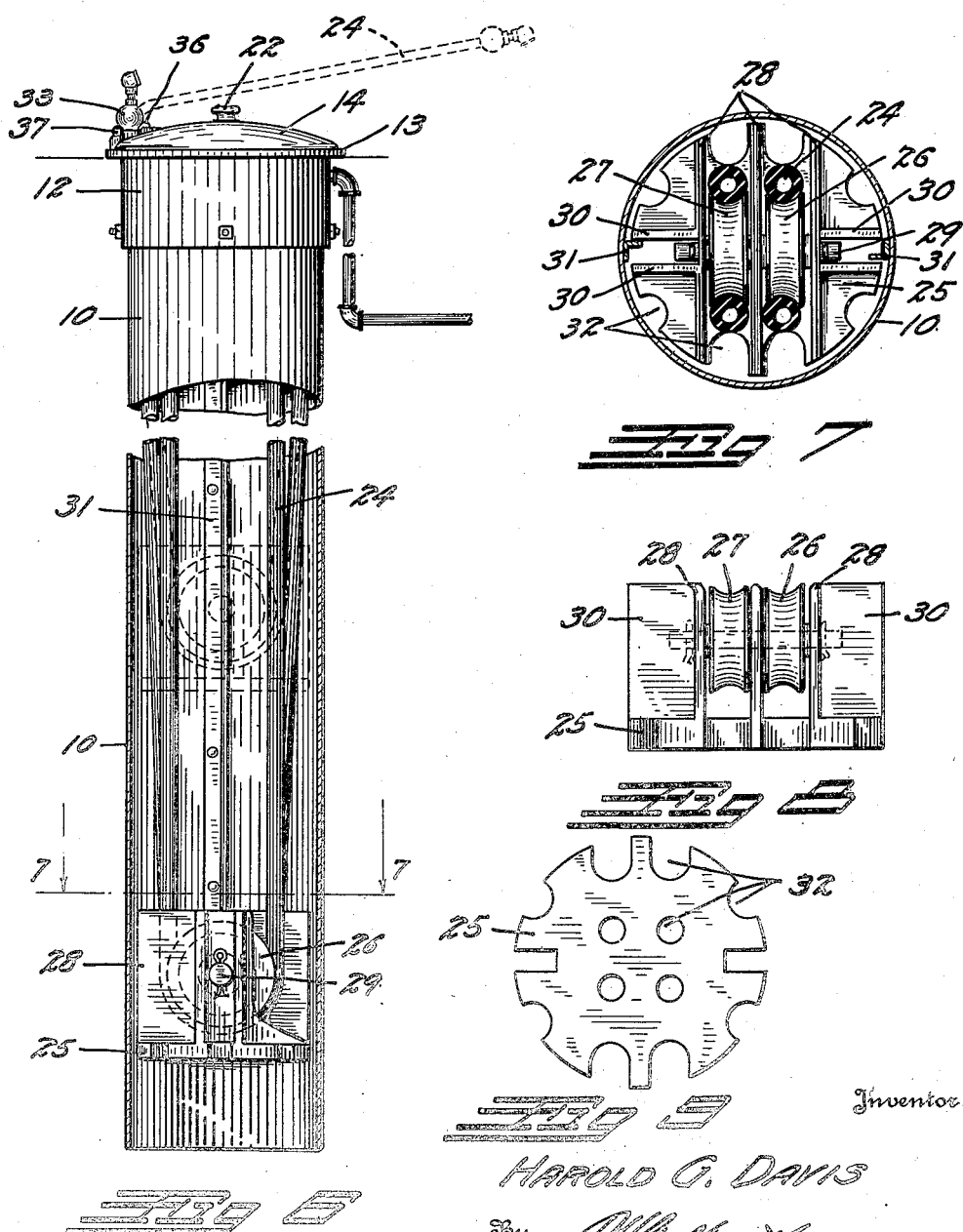

Patented July 5, 1932

1,866,251

UNITED STATES PATENT OFFICE

HAROLD G. DAVIS, OF DENVER, COLORADO

HOSE REEL AND PROTECTOR

Application filed March 10, 1931. Serial No. 521,413.

This invention relates to a device for reeling, concealing and protecting a hose and while particularly applicable to the air hose of an automobile filling station or garage, it is not limited to this use but will be found valuable wherever it is desired to reel, protect, or conceal an intermittently used hose.

The principal object of this invention is to provide a device of this character which will efficiently and automatically draw a hose into a protective container from which it can be easily and quickly withdrawn for use.

Another object of the invention is to so construct the device that the extremity of the hose can be quickly and easily disengaged so that it can be locked within the container to prevent unauthorized use thereof, when desired.

A further object of the invention is to so construct the device that it will be exceedingly difficult for surface water and drainage to enter the hose container and so that should any water enter the container it will not interfere with the efficient operation of the device.

A still further object is to so construct the reeling means that the hose will be efficiently guided over the reeling pulleys so as to prevent damage to the hose.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 illustrates a plan view of the complete device.

Fig. 2 is a detail sectional view through the upper portion of the device taken on the line 2—2, Fig. 1.

Fig. 3 is a detail view of the upper portion of the device illustrating the lid in a partially opened position.

Fig. 4 is a detail section taken on the line 4—4, Fig. 1.

Fig. 5 is a similar detail section taken on the line 5—5, Fig. 1.

Fig. 6 is a side elevation of the complete device with the casing thereof partially broken away to illustrate the interior construction.

Fig. 7 is a horizontal section taken on the line 7—7, Fig. 6.

Fig. 8 is a detail side elevation of the reeling weight.

Fig. 9 is a bottom view of the reeling weight.

The invention comprises a cylindrical casing 10 which may be of any desired length and which is preferably formed with an open bottom. The top of the casing 10 fits into a mortice 11 in a top band 12. The top band 12 is provided with a peripheral, horizontal flange 13 upon which a lid 14 rests. A locking hook 15 projects from the lid 14 and engages a locking opening 16 in the band 12. A lock tongue 17 projects upwardly from the band 12 through a slot 18 in the lid 14 to receive any suitable lock 44.

It will be noted that the band 12 is provided with an upwardly projecting bead 19 which extends upwardly within the lid 14. This bead serves a double purpose. It acts to align the lid with the band so that the lid may be quickly and easily placed in position. It also serves as a water dam to prevent water flowing between the lid and the band into the casing 10. A pulley hanger 20 is secured to and projects downwardly from the lid 14 and supports a top hose pulley 21. A hand knob 22 is provided by means of which the lid may be lifted.

The air, or other medium for which the device is intended, enters through an elbow 23 carried by the band 12 and to which the dispensing hose, indicated at 24, is connected. The proper tension is maintained in the hose 24 by means of a reeling weight 25 which carries a pair of pulleys 26 and 27. The weight 25 is of unusual construction and is provided with three upwardly extending vanes or wings 28 between which the pulley wheels 26 and 27 rotate. These vanes serve to guide the hose 24 about the pulley wheels, and also serve to prevent the hose from jumping from the wheels should it be suddenly released. They also provide a neat and efficient structure for inserting a pulley wheel shaft 29 for the pulleys.

Extending outwardly from the outermost vanes 28 are two pairs of side vanes 30 which act not only to brace the vanes 28 but also as vertical slide ways to direct the weight along vertical guides 31 on the interior of the casing 10.

It will also be noted that the bottom of the weight 25 is provided with a series of notches and openings 32. These serve as water passageways. The casing 10 may become partially filled with water owing to poor drainage conditions, rains, etc. It has been found that a solid weight on striking this water will descend very slowly since it requires an appreciable time for the water to escape around the weight to its upper side. This interferes with the quick action of the device and causes a slow return of the hose. By providing the series of passageways 32 and by the vertical construction of the vanes 28 and 30 the weight will settle rapidly regardless of water in the casing 10.

The hose is trained from the elbow 23 downwardly under the pulley 26, upwardly over the pulley 21, downwardly under the pulley 27, and again upwardly through the lid 14 terminating in a rubber terminal ball 33.

The lid 14 is notched at its periphery to pass around the hose 24. One side of this notch is closed by means of the top casing ring 12, the other sides are closed by the lid, so that by lifting the lid, the hose can be quickly and easily slipped from the notch so as to allow the ball to be placed inside of the container 10. The lid can then be locked to prevent unauthorized use thereof.

In the lid 14 two side rollers 34 and 35 and an end roller 36 are provided. The open side of the notch is closed by a roller 37, carried by the band 12 between upwardly projecting ears 38. All of these rollers are contoured to approximately fit the outer circumference of the hose and act to prevent wear upon the hose and to facilitate its withdrawal.

It will be noted that by this construction the mere act of lifting the lid removes one of the rollers, 37, from its position so as to allow the hose to be easily slipped from the embrace of the other rollers.

It is desired to call particular attention to the detail method of mounting the rollers 34, 35, and 36 in the lid 14. The entire set of three rollers is held in place and in alignment by two bolts 39 which act to draw cylindrical aligning blocks 40 into V shaped depressions 41 on the under side of the lid. Each aligning block 40 carries a stub shaft 42 for the support of the rollers 34 and 35, respectively, and each block is provided with a socket for the reception of a cross shaft 43 which carries the end roller 36. Thus, as the bolts 39 are tightened the aligning blocks 40 will be drawn into the V shaped grooves 41 so as to accurately position all of the three rollers about the notch in the lid 14.

The use of the device is apparent from the foregoing description. Briefly, when it is desired to use the hose it is simply drawn from the device. This causes the weight 25 to rise as shown in broken line in Fig. 6.

When the user has finished with the hose he simply releases the extremity and the weight 25 acts to draw the hose back into the container 10 until the terminal ball 33 reaches the rollers. When it is desired to prevent use of the hose the lid 14 is raised as shown in Fig. 3 and the hose is pulled from the enclosure of the rollers 34, 35, and 36 and allowed to drop into the container. The lid is then returned to position and locked in place by means of a suitable padlock as indicated in broken line at 44.

When installed, the peripheral flange 13 rests upon the floor or other surrounding surface and acts as a support for the entire device. To facilitate the removal of the entire device, holes 45 are provided in the upper extremities of the guide bars 31 in which hooks may be engaged to lift the entire device from place.

The vanes 28 and 30 serve another purpose in addition to the one previously described, in that they act as vertical guides against the casing 10 to prevent the weight from tipping or cocking and becoming fast in the casing. When two pulleys are employed, a sudden pull upon the hose tends to tip the weight unless the latter is made with relatively long bearing surfaces. If the weight itself were made sufficiently long to act as a guide it would be too heavy. Therefore, by providing the thin vanes the guiding is accomplished without unduly increasing the weight. They also serve to position the pulleys 26 and 27 relatively close to the bottom of the weight so that a maximum length of hose can be reeled into a minimum length of the casing.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A hose reeling device comprising: a container; means for drawing a hose within said container; a lid for said container, said lid being provided with an orifice for the passage of said hose said orifice being positioned at the periphery of said lid so that one side thereof will be closed by said container when said lid is in position so as to allow said hose to be removed from said orifice when said lid is lifted from position; and a series of rollers surrounding said orifice, certain of said rollers being carried by said lid, the remaining by said container.

2. A hose reeling device comprising: a container; means for drawing a hose therewithin; a band surrounding the upper extremity of said container; a roller carried by said band; a lid for said container, said lid being notched adjacent said roller for the passage of said hose so that said roller will close said notch when said lid is in position.

3. A hose reeling device comprising: a container; means for drawing a hose therewithin; a band surrounding the upper extremity of said container; a roller carried by said band; a lid for said container, said lid being notched adjacent said roller for the passage of said hose so that said roller will close said notch when said lid is in position; and other rollers carried by said lid about said notch.

4. Means for attaching rollers about an orifice in the lid of a hose container comprising: V shaped depressions formed on the underside of said lid; aligning blocks; means for drawing said aligning blocks into said depressions; and stub shafts extending from said blocks and carrying said rollers.

In testimony whereof, I affix my signature.

HAROLD G. DAVIS.